(12) United States Patent
Zhang et al.

(10) Patent No.: US 9,868,081 B1
(45) Date of Patent: Jan. 16, 2018

(54) WATER TREATMENT CARTRIDGE WITH SEALABLE INLET AND OUTLET TO PREVENT LEAKS

(71) Applicants: Xiang Zhang, Katy, TX (US); Zhiyi Li, Katy, TX (US)

(72) Inventors: Xiang Zhang, Katy, TX (US); Zhiyi Li, Katy, TX (US)

(*) Notice: Subject to any disclaimer, the term of this patent is extended or adjusted under 35 U.S.C. 154(b) by 0 days.

(21) Appl. No.: 15/293,143

(22) Filed: Oct. 13, 2016

Related U.S. Application Data (60) Provisional application No. 62/272,869, filed on Dec. 30, 2015.

(51) Int. Cl.
| | | |
|---|---|---|
| *F16K 43/00* | (2006.01) | |
| *B01D 35/153* | (2006.01) | |
| *F16L 37/40* | (2006.01) | |
| *C02F 1/00* | (2006.01) | |
| *B01D 29/96* | (2006.01) | |

(52) U.S. Cl.
CPC ........... *B01D 35/153* (2013.01); *B01D 29/96* (2013.01); *C02F 1/001* (2013.01); *F16L 37/40* (2013.01); *B01D 2201/16* (2013.01); *B01D 2201/302* (2013.01); *B01D 2201/4023* (2013.01); *C02F 2201/005* (2013.01); *C02F 2201/006* (2013.01)

(58) Field of Classification Search
CPC ............... B01D 35/147; B01D 35/153; B01D 2201/305; Y10T 137/87161; C02F 2201/006
USPC ...... 137/315.11, 594, 595; 251/149.1, 149.6, 251/149.9
See application file for complete search history.

(56) References Cited

U.S. PATENT DOCUMENTS

| | | | | |
|---|---|---|---|---|
| 5,698,093 A | * | 12/1997 | Pyle ..................... | B01D 35/153 210/136 |
| 5,914,037 A | * | 6/1999 | Yen ...................... | B01D 35/153 210/234 |
| 6,632,355 B2 | * | 10/2003 | Fritze ................... | B01D 35/153 210/232 |
| 7,000,894 B2 | | 2/2006 | Olson | |
| 7,610,932 B2 | | 11/2009 | Olson et al. | |
| 7,658,205 B1 | * | 2/2010 | Edelman ................ | F16L 37/32 137/594 |
| 8,398,853 B2 | * | 3/2013 | An ....................... | B01D 35/147 137/594 |

\* cited by examiner

*Primary Examiner* — Reinaldo Sanchez-Medina
(74) *Attorney, Agent, or Firm* — Mark H. Plager (57) ABSTRACT

A water treatment cartridge for an assembly head having a pair of valves for controlling the flow of water therethrough is provided. The cartridge includes a connector coupled to the assembly head and having a cartridge body with an inlet and an outlet, an inner end cover coupled to the cartridge body's interior, a pair of valve stems disposed within the cartridge body and connected to the assembly head, the valve stems including a first valve stem disposed within the inlet and a second valve stem disposed within the outlet, each valve stem having a head, a rod enclosed within the inlet or outlet, and a tail within the cartridge body, and a pair of driving springs coupled to the pair of valve stems and inner end cover.

8 Claims, 11 Drawing Sheets

FIG.33

WATER TREATMENT CARTRIDGE WITH SEALABLE INLET AND OUTLET TO PREVENT LEAKS

RELATED APPLICATION

The application claims priority to provisional patent application U.S. Ser. No. 62/272,869 filed on Dec. 30, 2015, the entire contents of which is herein incorporated by reference.

BACKGROUND

The embodiments herein relate generally to water treatment devices and equipment. More specifically, embodiments relate to water treatment cartridges capable of preventing the phenomena of water dripping, water leakage and treatment media pollution.

Plug-in type water treatment cartridges improve the leakage phenomenon of prior cartridge designs comprising threaded spiral connections that wore over time and therefore caused water leaks. The general structure of the plug-in type water treatment cartridge is shown in U.S. Pat. No. 7,610,932 B2, which comprises a water ingoing cylinder and a water outgoing cylinder that are arranged on the body of a filter, as well as a water inlet driving rib and a water outlet driving rib that have an inclined plane structure arranged at the end portion of the water ingoing cylinder and the water outgoing cylinder respectively. The filter is provided with an assembling head for supporting its use. The assembling head is internally provided with a water inlet driving valve and a water outlet driving valve that are driven by a spring respectively, the water inlet driving rib and the water outlet driving rib of the filter body can control the opening of both the water inlet driving valve and the water outlet driving valve of the assembling head via the inclined plane structure respectively, so as to enable water to access the filter for filtration. The inside of the treatment cartridge comprises a structure that is directly communicated with the outside environment, so that the water treatment media for filtering is likely to be contaminated or dampened.

In some technologies, an independently installed seal cover is often used for separating the inside of the filter from the outside environment. However, frequent disassembly is likely to cause a poor sealing fit of the seal cover over time. In other circumstances, event damage or loss of the seal cover will render the cover ineffective. Under these circumstances, the water treatment media will become contaminated or dampened, thereby shortening the service life of the water cartridge.

In addition, the process of connecting or disconnecting the cartridge with the assembling head exposes the inside of the cartridge to the outer environment, which causes remaining water in the cartridge to directly flow out through the water ingoing cylinder and the water outgoing cylinder. This water dripping and leakage contaminates the surrounding environment.

As such, there is a need in the industry for a water treatment cartridge with a sealable inlet and sealable outlet that addresses the limitations of the prior art, which minimizes treatment media pollution and dampening, and prevents water dripping and leakage when the cartridge is removed from the assembly head.

SUMMARY

A water treatment cartridge for use with an assembly head comprising a pair of valves for controlling the flow of water therethrough is provided. The water treatment cartridge comprises an inlet and an outlet both in communication with the valves and configured to automatically close upon a removal of the water treatment cartridge from the assembly head, thereby minimizing water leaks and contamination to the water treatment cartridge. The water treatment cartridge comprises a connector member detachably coupled to the assembly head and comprising a cartridge body comprising an inlet and an outlet, an inner end cover coupled to the interior of the cartridge body, a pair of valve stems disposed within the cartridge body and configured to be operably connected to the assembly head, the pair of valve stems comprising a first valve stem disposed within the inlet and a second valve stem disposed within the outlet, each valve stem of the pair of valve stems comprising a head portion extending out of the inlet or outlet, a rod portion enclosed within the inlet or outlet, and a tail portion positioned within the cartridge body, and a pair of driving springs coupled to the pair of valve stems, the pair of driving springs comprising a first driving spring in contact with the tail portion of the first valve stem and inner end cover and a second driving spring in contact with the tail portion of the second valve stem and inner end cover, wherein the head portions of both the first and second valve stems are configured to contact the assembly head to compress the first and second driving springs, thereby removing the tail portions of the first and second valve stems from the inlet and outlet to permit water to flow therethrough, wherein the first and second valve stems are configured to be detached from the assembly head to decompress the first and second driving springs, thereby permitting the tail portions of the first and second valve stems to seal both the inlet and outlet, thereby minimizing water leaks and contamination to the water treatment cartridge.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

It should be understood that the orientation or position relations denoted by terms "center", "longitudinal", "transverse", "upper", "lower", "front", "back", "left", "right", "vertical", "horizontal", "top", "bottom", "inside", "outside" and the like are based on the orientation or position relations as shown in the attached drawings only for the purpose of facilitating to describe the invention and simplify the description rather than indicating or implying that the device or element referred to must have a specific direction or constructed and operated in a specific direction; therefore, these cannot be interpreted as a limit to the inventive creation. In addition, terms "first" and "second" are only used for the purpose of description and cannot be interpreted as indication or implication of corresponding importance or implicit indication of the number of the prescriptive technical feature. In the descriptions of the inventive creation, unless otherwise noted in the description of the invention, "a plurality of" means two or more.

In the description of the inventive creation, it should be noted that unless otherwise stipulated or limited explicitly, terms "installation", "joining", and "connection" shall be understood generally for example, it may either be fixed connection, detachable connection or integrated connection; or mechanical connection, or electric connection; or direct connection, or indirect connection through an intermediation, or internal communication of two elements. Those common skilled in the art can understand the specific meaning of the above-mentioned terms in the inventive creation according to specific circumstances.

In the description of the inventive creation, it should be noted that terms "water treatment cartridge", "water ingoing cylinder", "water outgoing cylinder", "water inlet passage", "water outlet passage", "water flow" and the like in regard to "water" are only for the purpose of convenience in description. It will be simple to describe the fluid capable of being applied in the device of the inventive creation as common "water", which can be generally understood to be a "liquid phase fluid" rather than the fluid being only limited to water.

As depicted in FIGS. 1-4 and 31-33, the water treatment cartridge generally comprises connector 01, cartridge body 08, water ingoing cylinder 011, water outgoing cylinder 012, a pair of specially shaped valve stems 02, a pair of driving springs 03 and inner end cover 04. The water treatment cartridge is configured to communicate with driving valve 061 of assembly head 06 to control the flow of water therethrough. It shall be appreciated that a pair of driving valves 061 correspond to the pair of specially shaped valve stems 02 disposed within water ingoing cylinder 011 and water outgoing cylinder 012 respectively.

In certain embodiments, connector 01 comprises water ingoing cylinder 011 and water outgoing cylinder 012, which both communicate with the inside of cartridge body 08 from the outer wall of the top surface of connector 01. Specifically, water ingoing cylinder 011 and water outgoing cylinder 012 communicate with the inside of the cartridge through water inlet passage 0111 and water outlet passage 0121 respectively. First dividing wall 013 is coupled to the inner wall of connector 01 and extends inward.

First dividing wall 013 comprises a passage and end connected to the inner wall of connector 01 and directly communicates with water outlet passage 0121 of water outgoing cylinder 012. The passage of first dividing wall 013 does not communicate with water inlet passage 0111 of water ingoing cylinder 011. In a preferred embodiment, water ingoing cylinder 011 and water outgoing cylinder 012 are integrally connected with the outer wall of the top surface of connector 01 in an extending mode. First dividing wall 013 is integrally connected with the inner wall of connector 01 in an extending mode. It shall be appreciated that water ingoing cylinder 011 and water outgoing cylinder 012 can have the same structure and may be collectively referred to as water ingoing-outgoing cylinder 010 herein. Likewise, water inlet passage 0111 and water outlet passage 0121 may be referred to collectively as water inlet-outlet passage 0101.

Figure 1:
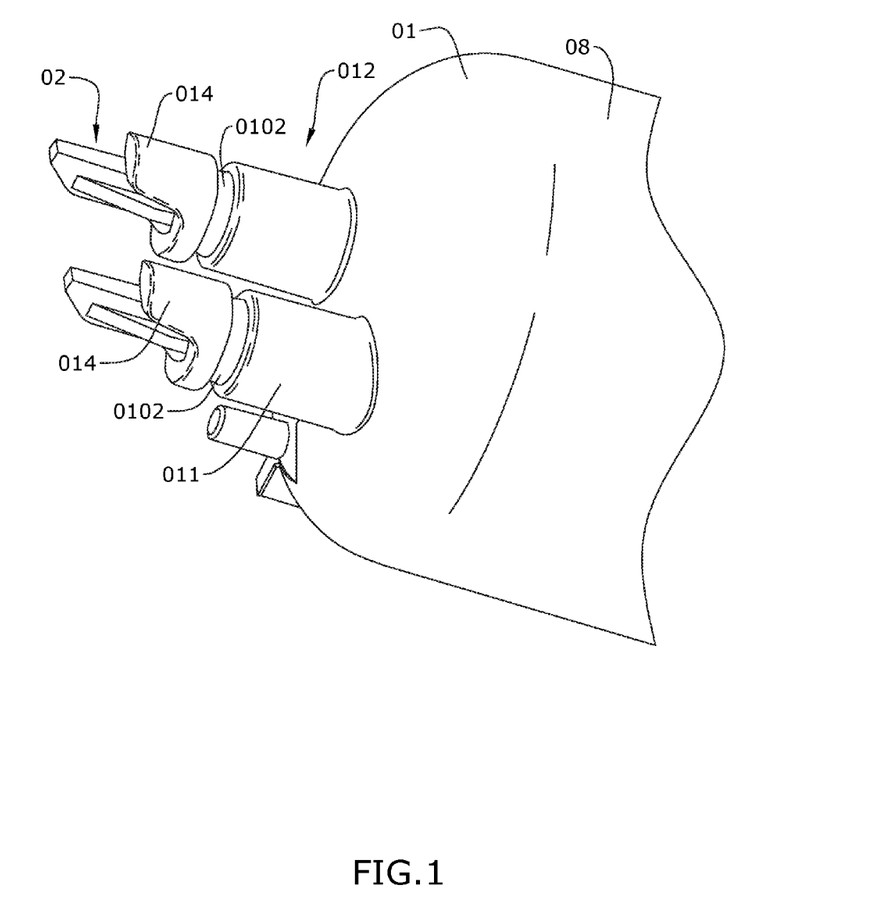
FIG. 1 depicts a perspective view of certain embodiments of the water treatment cartridge.
Figure 2:
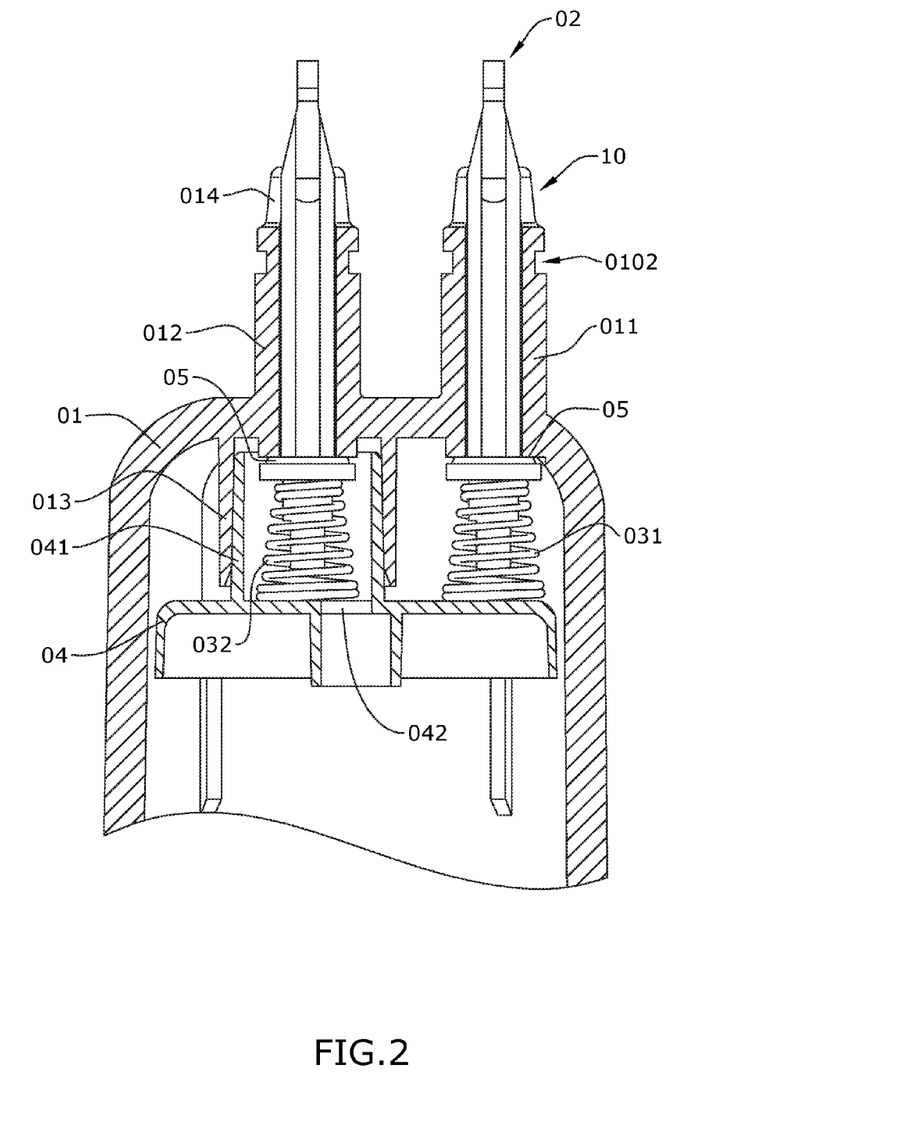
FIG. 2 depicts a section view of certain embodiments of the water treatment cartridge.
Figure 4:
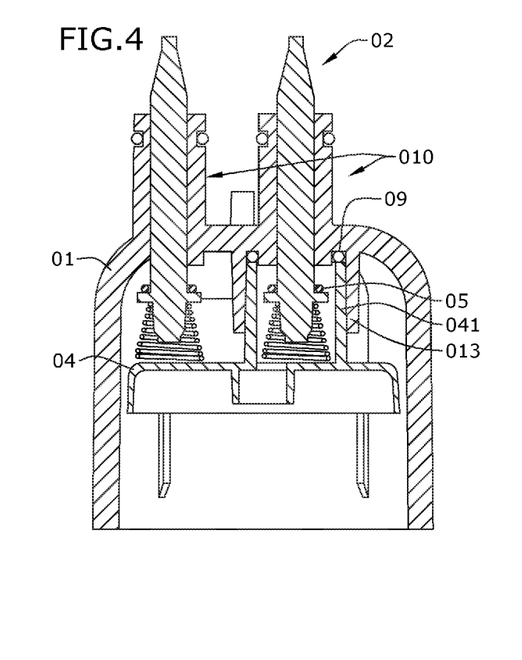
FIG. 4 depicts a section view of certain embodiments of the water treatment cartridge.
Figure 32:
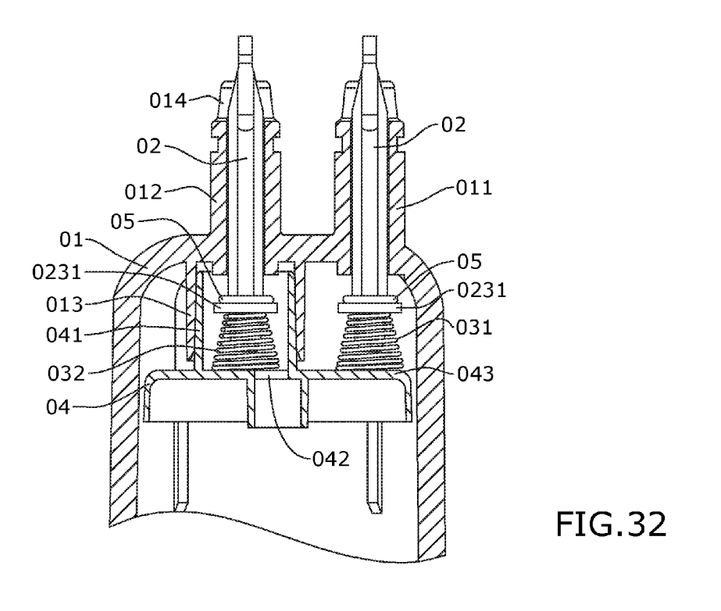
FIG. 32 depicts a sectional view of certain embodiments of the water treatment cartridge shown in use.

In certain embodiments, the water treatment cartridge comprises inner end cover 04, which comprises outer end face 043 and second dividing wall 041, which is capable of being hermetically matched with first dividing wall 013 of connector 01. Through hole 042 passes through outer end face 043 of inner end cover 04 and is positioned within second dividing wall 041. In a preferred embodiment, first dividing wall 013 and second dividing wall 041 are in a detachable seal fit. In an alternative preferred embodiment, first dividing wall 013 and second dividing wall 041 are connected with a taper seal fit as shown in FIG. 2 and FIG. 32 or in a rubber ring seal fit as shown in FIG. 4. In the case of a rubber ring seal fit, second dividing wall 041 is hermetically matched with first dividing wall 013 through third seal ring 09 arranged at the top end of the inner wall thereof.

A first specially shaped valve stem 02 is movably sheathed in the water inlet passage 0111 of water ingoing cylinder 011. A second specially shaped valve stem 02 is movably sheathed in an interconnected passage jointly formed by the first water outgoing cylinder 012 and first dividing wall 013. Specially shaped valve stems 02 are in a sliding fit with either water ingoing cylinder 011 or water outgoing cylinder 012. Each specially shaped valve stem 02 located within water inlet passage 0111 of water ingoing cylinder 011 or water outlet passage 0121 of water outgoing cylinder 012 forms a gap between the valve stem and water inlet-outlet passage 0101 for water to flow through.

In certain embodiments, a first specially shaped valve stem 0201 is configured to be disposed in water ingoing cylinder 011 and a second specially shaped valve stem 0202 is configured to be disposed in water outgoing cylinder 012. Since both first specially shaped valve stem 0201 and second specially shaped valve stem 0202 can have the same structure, both specially shaped valve stems may be collectively referred to as specially shaped valve stems 02 herein.

Figure 31:
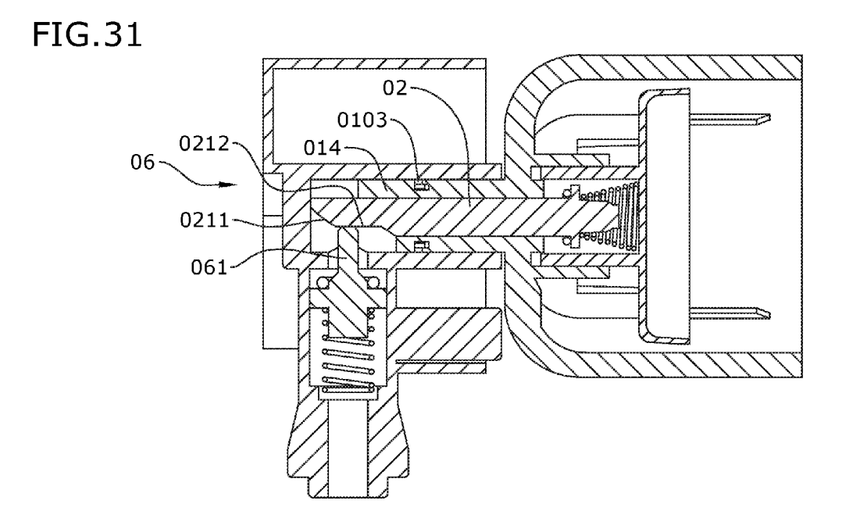
FIG. 31 depicts a sectional view of certain embodiments of the water treatment cartridge shown in use.

In certain embodiments, each specially shaped valve stem 02 comprises head portion 021, rod portion 022 and tail portion 023. Head portion 021 extends with driving inclined plane 0211 and pressing plane 0212 from the top end of specially shaped valve stem 02 to the tail portion 023. Driving inclined plane 0211 and pressing plane 0212 are respectively used for driving and maintaining the opening of driving valve 061 in the assembly head 06 for supporting use with the water treatment cartridge as shown in FIG. 31.

Rod portion 022 for each specially shaped valve stem 02 is connected with head portion 021 and tail portion 023 with at least part of rod portion 022 located within water inlet-outlet passage 0101 of water ingoing-outgoing cylinder 010. Each rod portion 022 can slidably adjust within water inlet-outlet passage 0101.

Tail portion 023 of each specially shaped valve stem 02 comprises platform 0231 oriented perpendicular to the extending direction (longitudinal axis) of water inlet-outlet passage 0101. Rod portion 022 of each specially shaped valve stem 02 is configured to slidably adjust relative to water inlet-outlet passage 0101 to permit platform 0231 to completely cover or further seal the end port of water inlet-outlet passage 0101 in the cartridge, i.e., enable platform 0231 and water inlet-outlet passage 0101 to be in a taper seal fit, and the like.

Figure 5:
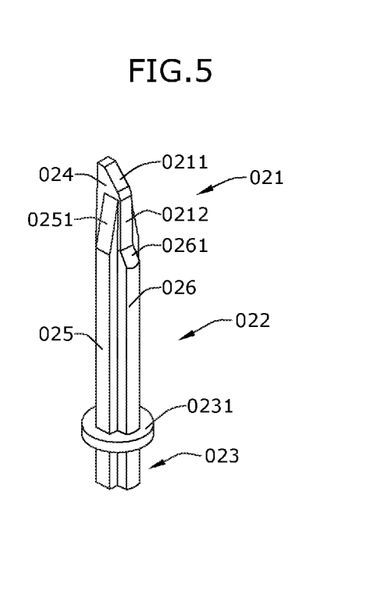
FIG. 5 depicts a perspective view of certain embodiments of the water treatment cartridge illustrating a specially shaped valve stem.

Tail portion 023 of each specially shaped valve stem 02 independently exists or exists as a changeless part including the structure extended from rod portion 022. In certain embodiments, tail portion 023 can be a self-existent component with a specific structure fixedly connected with the rod portion 022, or can be an independent part with a specific structure integrally connected with rod portion 022 (FIG. 3, FIG. 9, FIG. 10, FIG. 12, FIG. 13, FIG. 16, FIG. 17, FIG. 19, and the like), or can be a part including a part of rod portion 022 located at the tail end and jointly formed by an additional structure such as platform 0231 as shown in FIG. 5.

Each driving spring 03 comprises an end connected to tail portion 023 of one of specially shaped valve stems 02 and another end fixed to outer end face 043 of inner end cover 04. In order to distinguish the specific positions of the two driving springs 03, first driving spring 031 and second driving spring 032 are respectively used for referring to driving springs 03 connected with first specially shaped valve stem 0201 and second specially shaped valve stem 0202. However, driving springs 03 may be used to refer to both first driving spring 031 and second driving spring 032. In a preferred embodiment, each driving spring 03 comprises a circular truncated cone shape, which enhances stability and support of specially shaped valve stems 02. It shall be appreciated that tail portion 023 of each valve stem can be used to adjust driving spring 03 to permit tail portion 023 to open or close water inlet-outlet passage 0101.

In certain embodiments, tail portion 023 of each specially shaped valve stem 02 is provided with platform 0231, supporting portion 0232 and limiting portion 0233. The outer diameter of the upper end of supporting portion 0232 is matched with the inner diameter of the upper end of the passage formed by driving spring 03. This allows driving spring 03 to encircle and be positioned outside supporting portion 0232. The top of driving spring 03 is pushed against the bottom face of platform 0231 to play a role in limiting and fixing driving spring 03. Limiting portion 0233 can limit the stroke of specially shaped valve stem 02 when it moves down, thereby preventing an oversized stroke, preventing driving valve 061 in the assembly head 06 from being unable to open, and minimizing excessive compression of driving spring 03.

In certain embodiments, the end face of water inlet-outlet passage 0101 is located in the inner part of cartridge body 08. In a preferred embodiment, platform 0231 of tail portion 023 of each specially shaped valve stem 02 is provided with a second seal ring 05 (FIG. 2, FIG. 3 and FIG. 32), which can achieve an improved seal when platform 0231 of specially shaped valve stem 02 closes the water inlet-outlet passage 0101 upon contact.

In order to enable specially shaped valve stem 02 and water inlet-outlet passage 0101 to achieve an improved sliding fit and ensure a stable fit with assembly head 06 in the plug-in process, there must be a sufficient gap between rod portion 022 and water ingoing-outgoing cylinder 010 for water to pass through in water inlet-outlet passage 0101. On the other hand, rod portion 022 of specially shaped valve stem 02 requires a sufficient supporting effect in the water inlet-outlet passage 0101, thereby avoiding shock and rotation of rod portion 022.

Generally, the circumscribed circle of the cross section (hereinafter referred to as the cross section of the rod portion) of rod portion 022 of specially shaped valve stem 02 oriented perpendicular to the extending direction (or motion direction) is generally circular and coaxial. In a preferred embodiment, the shape of the cross section of rod portion 022 is the same (i.e., the cross section of the rod portion is equal or the rod portion has a uniform cross section). In certain embodiments, the diameter of the circumscribed circle of the cross section of rod portion 022 is generally 0.05-0.1 mm shorter than the inner diameter of water inlet-outlet passage 0101, which permits rod portion 022 to slide within water inlet-outlet passage 0101. In order to ensure smooth water flow through water inlet-outlet passage 0101, the cross sectional area of rod portion 022 shall not be greater than 80% of the cross sectional area of water inlet-outlet passage 0101 in the same direction. However, this percentage is preferably 65%.

In order to achieve a better supporting effect, i.e., the rod portion 022 has better supporting strength in the water inlet-outlet passage 0101, it is needed that on the circumscribed circle of the cross section of rod portion 022, the circumscribed circular arc corresponding to any 150° central angle (preferred as 120° central angle) has at least two points of intersection of the cross section and the circumscribed circle thereof, or to say, on the circumscribed circle of the cross section of the rod portion, the central angle corresponding to the circumscribed circular arc between any two points of intersection of the cross section and the circumscribed circle thereof is not greater than 150° (preferably not greater than 120°). In some conditions, the cross section of the rod portion can be intersected with the circumscribed circle thereof as a circular arc, and the point of intersection of the cross section and the circumscribed circle can be deemed as any one point on the intersected circular arc.

Figure 3:
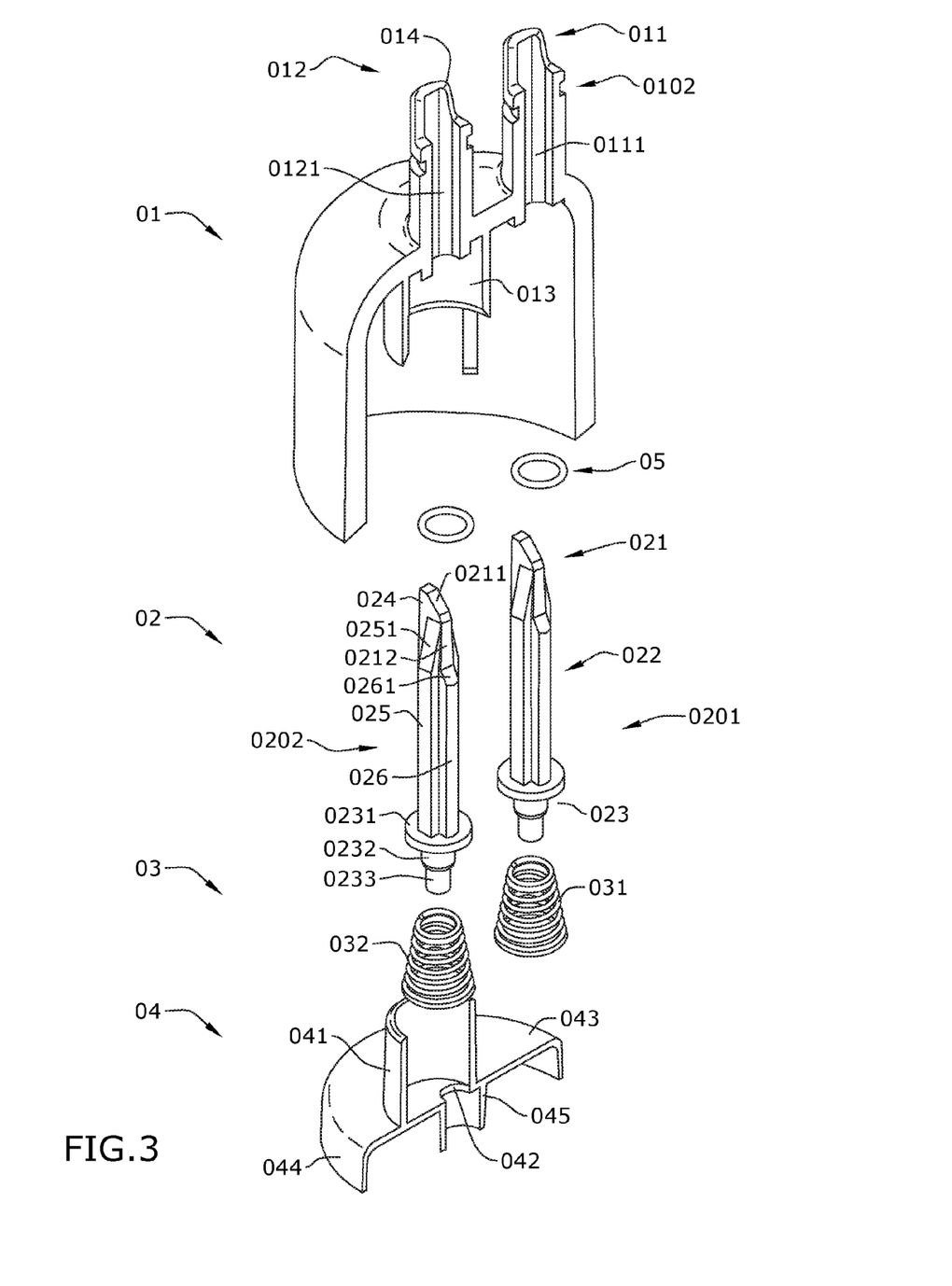
FIG. 3 depicts an exploded view of certain embodiments of the water treatment cartridge.

Specially shaped valve stems 02 may have various designs for different applications. In certain embodiments, specially shaped valve stems 02 are illustrated in FIG. 3. In these embodiments, tail portion 023 of each specially shaped valve stem 02 comprises platform 0231, supporting portion 0232 and limiting portion 0233. Head portion 021 and rod portion 022 are integrated and formed by trapezoid wall 024 located in the middle. Reinforcing ribs 025 are symmetrically arranged at both wings of trapezoid wall 024 and supporting rib 026 is coupled to the shorter end of trapezoid wall 024.

Figure 6:
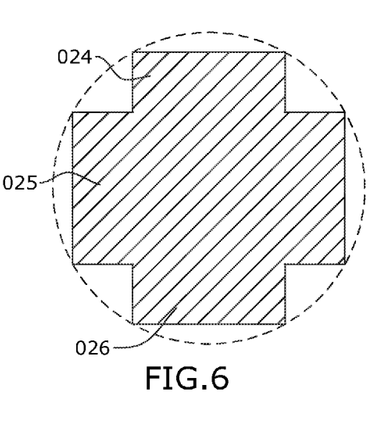
FIG. 6 depicts a section view of certain embodiments of the water treatment cartridge illustrating a rod portion of the specially shaped valve stem in FIG. 3.
Figure 7:
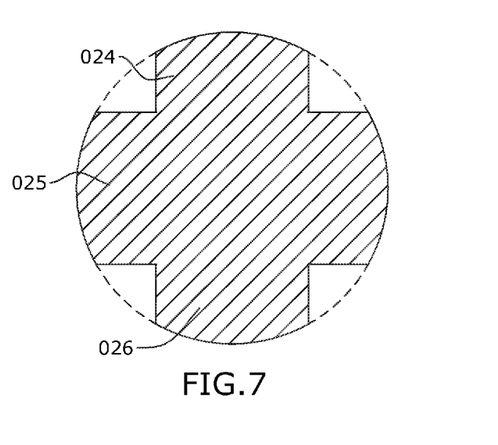
FIG. 7 depicts a section view of an alternative embodiment of the water treatment cartridge illustrating a rod portion of the specially shaped valve stem.
Figure 8:
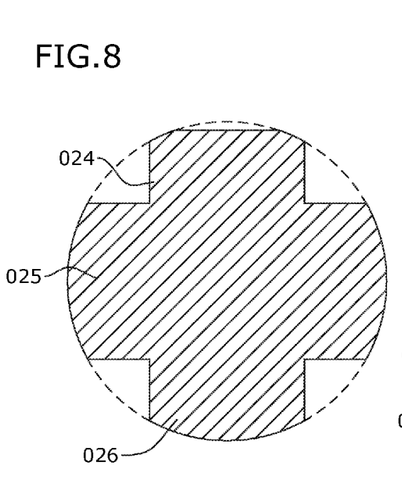
FIG. 8 depicts a section view of an alternative embodiment of the water treatment cartridge illustrating a rod portion of the specially shaped valve stem.

Rod portion 022 comprises a cross-shaped cross section and is provided with coaxially circumscribed circles. The cross-shaped cross section of rod portion 022 is intersected with the circumscribed circle thereof as a point or an arc, i.e, the surface of trapezoid wall 024, reinforcing rib 025 and supporting rib 026 facing outside along the extending direction can be an independent plane, cambered surface or plane with cambered surface circular bead respectively. Several structures of the cross-shaped cross section of rod portion 022 and the circumscribed circle thereof are shown in FIGS. 6-8.

In certain embodiments, the horizontal extending portion of the top bevel edge of trapezoid wall 024 forms a driving inclined plane 0211. The height of the supporting rib 026 is lower than the height of the shorter end of trapezoid wall 024. This difference in height forms pressing plane 0212. The top terminal of supporting rib 026 extends along the direction of trapezoid wall 024 to form supporting rib inclined plane 0261. The height of reinforcing rib 025 is lower than the height of trapezoid wall 024 in the position where the reinforcing rib is located. In one embodiment, the top portion of reinforcing rib 025 is closer to the bevel edge of trapezoid wall 024 and is higher than the height of the top portion of supporting rib 026.

The top terminal of reinforcing rib 025 extends along the direction of trapezoid wall 024 to form reinforcing rib inclined plane 0251. The arrangement of supporting rib inclined plane 0261 and reinforcing rib inclined plane 0251 is beneficial in guiding and improving the stability of each specially shaped valve stem 02. Driving inclined plane 0211 is formed by the extending portion of the top bevel edge of trapezoid wall 024.

Figure 9:
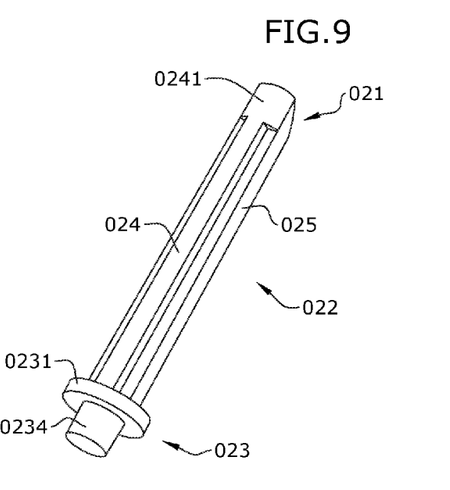
FIG. 9 depicts a perspective view of an alternative embodiment of the water treatment cartridge illustrating a specially shaped valve stem.
Figure 10:
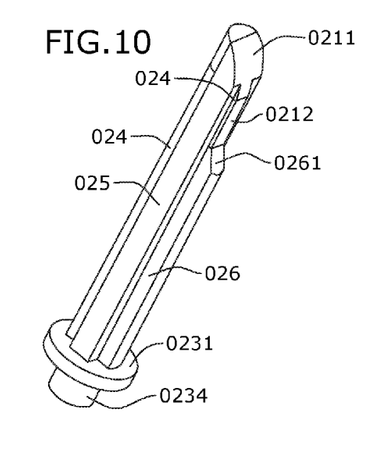
FIG. 10 depicts a perspective view of an alternative embodiment of the water treatment cartridge illustrating a specially shaped valve stem.
Figure 11:
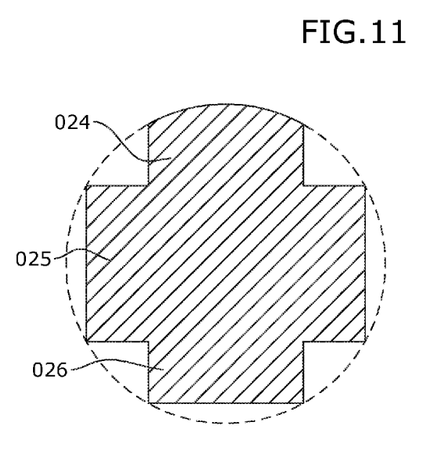
FIG. 11 depicts a section view of certain embodiments of the water treatment cartridge illustrating the rod portion of the specially shaped valve stems in FIGS. 9-10.

FIGS. 9-10 depict an alternative embodiment of specially shaped valve stem 02 that comprises several components similar to the valve stem in FIG. 3. In this embodiment, tail portion 023 comprises platform 0231, an original supporting portion 0232 and limiting portion 0233 that are integrally synthesized as supporting and limiting portion 0234. Head portion 021 and rod portion 022 are integrally formed with trapezoid wall 024 located in the middle. Reinforcing ribs 025 are symmetrically arranged at both wings of trapezoid wall 024. Supporting rib 026 is located at the shorter end of trapezoid wall 024. In this embodiment, rod portion 022 comprises a uniform cross section portion with a cross shape provided with coaxially circumscribed circles. On the cross-shaped cross section of rod portion 022, at least the surface of the trapezoid wall 024 facing outside along the extending direction is intersected with the circumscribed circle thereof as an arc, as shown in FIG. 7 or FIG. 11.

The horizontal extending portion of the top bevel edge of trapezoid wall 024 forms driving inclined plane 0211. The height of supporting rib 026 is lower than the height of the lower end of trapezoid wall 024. This difference in height forms pressing plane 0212. The top terminal of supporting rib 026 extends along the direction of trapezoid wall 024 to form supporting rib inclined plane 0261. Reinforcing rib 025 extends upward and is intersected by driving inclined plane 0211. The top portion of the surface of trapezoid wall 024 facing outside opposite to the position of supporting rib 026 extends toward both sides along the radian direction of the circumscribed circle of the uniform circumscribed circle to form a circular arc surface 0241 respectively and is intersected with the reinforcing ribs 025 located at both sides. In certain embodiments, the height position of the minimum position of the circular arc surface 0241 is higher than the height position of the outer end face of water ingoing-outgoing cylinder 010 when the specially shaped valve stem 02 moves to the minimum position.

Figures 12, 13:
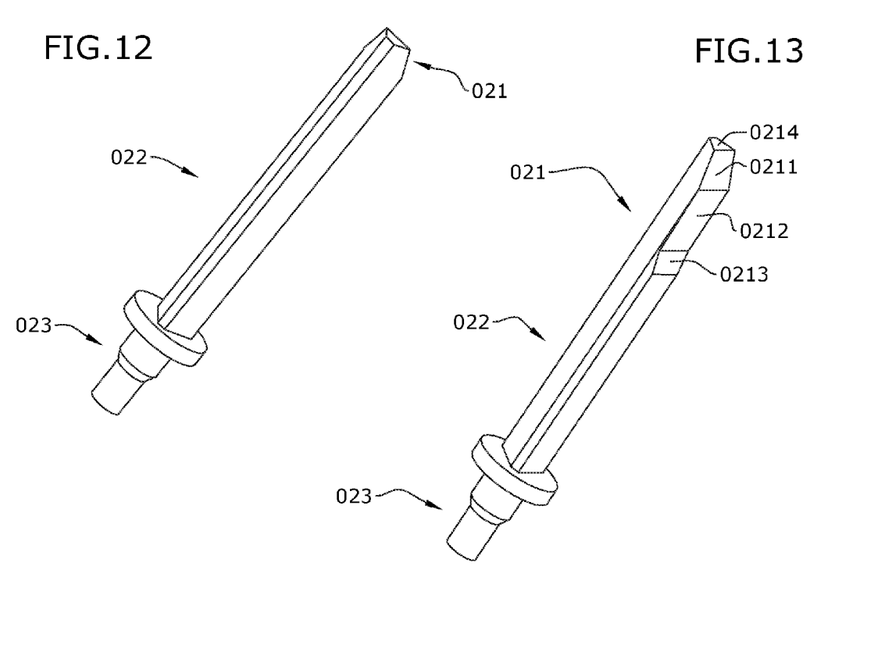
FIG. 12 depicts a perspective view of an alternative embodiment of the water treatment cartridge illustrating a specially shaped valve stem.
FIG. 13 depicts a perspective view of an alternative embodiment of the water treatment cartridge illustrating a specially shaped valve stem.
Figure 14:
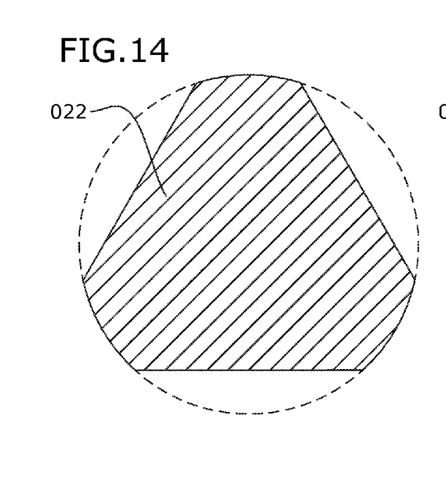
FIG. 14 depicts a section view of certain embodiments of the water treatment cartridge illustrating a rod portion of the specially shaped valve stem.
Figure 15:
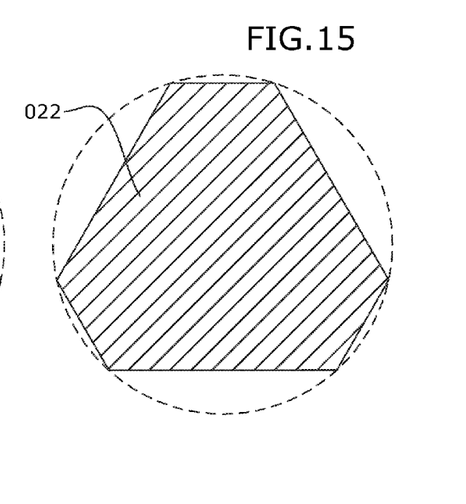
FIG. 15 depicts a section view of certain embodiments of the water treatment cartridge illustrating a rod portion of the specially shaped valve stem.

FIGS. 12-13 depict an alternative embodiment of specially shaped valve stem 02 that comprises several components substantially similar to the valve stem in FIG. 3. In this embodiment, the structure of tail portion 023 remains the same. Head portion 021 and rod portion 022 are integrally formed. Rod portion 022 is formed by stretching the triangular uniform cross section of the circular bead (FIG. 14) or the chamber (FIG. 15), and the camber line of the circular bead or the vertex of the chamber on the triangular uniform cross section is located on the circular arc of the circumscribed circle in which the cross section is located.

From the top end of any side plane of rod portion 022 formed by stretching a triangle edge of the triangular uniform cross section, transition inclined plane 0213, pressing plane 0212 and driving inclined plane 0211 are extended upward in a step-like mode in order. Transition inclined plane 0213, pressing plane 0212 and driving inclined plane 0211 extend and are intersected with other continuously stretching upward side faces of rod portion 022 respectively to form head portion 021 with a non-uniform cross section. Preferably, the top surface of head portion 021 is a top plane 0214 oriented perpendicular to the extending direction of rod portion 022 and intersected with driving inclined plane 0211.

Figure 16:
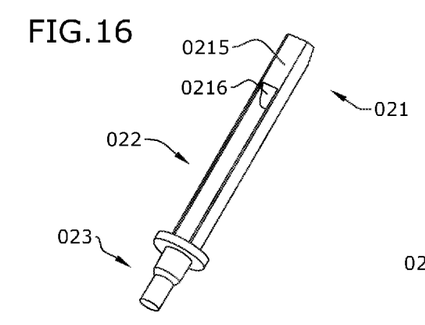
FIG. 16 depicts a perspective view of an alternative embodiment of the water treatment cartridge illustrating a specially shaped valve stem.
Figure 17:
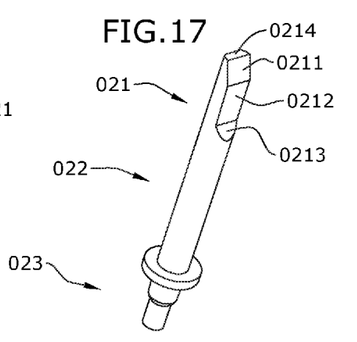
FIG. 17 depicts a perspective view of an alternative embodiment of the water treatment cartridge illustrating the specially shaped valve stem.

FIGS. 16-17 depict an alternative embodiment of specially shaped valve stem 02 that comprises several components substantially similar to the valve stem in FIG. 3. In this embodiment, the structure of tail portion 023 remains the same. Head portion 021 and rod portion 022 are integrally formed. Rod portion 022 is formed by stretching the uniform cross section to have a generally U-shape.

Figure 18:
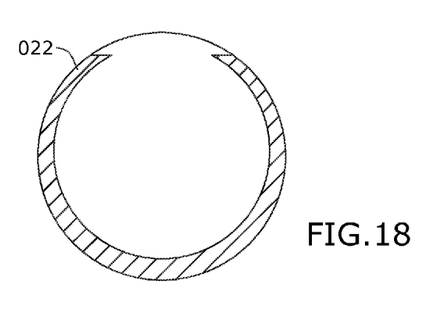
FIG. 18 depicts a section view of certain embodiments of the water treatment cartridge taken along the rod portion of the specially shaped valve stem in FIGS. 16-17.

The circumscribed circular arc of the uniform cross section similar to a U-shape is overlapped with the circumscribed circle of the cross section as shown in FIG. 18. On the outside of rod portion 022 and head portion 021, transition inclined plane 0213, pressing plane 0212 and driving inclined plane 0211 are extended upward in a step-like mode in order.

Transition inclined plane 0213, pressing plane 0212 and driving inclined plane 0211 extend and are intersected with continuously stretched upward outer side faces of rod portion 022. Driving inclined plane 0211 intersects with top plane 0214 oriented perpendicular to the extending direction of rod portion 022. Upper plane 0215 intersects both top plane 0214 and guiding inclined plane 0216.

Figure 19:
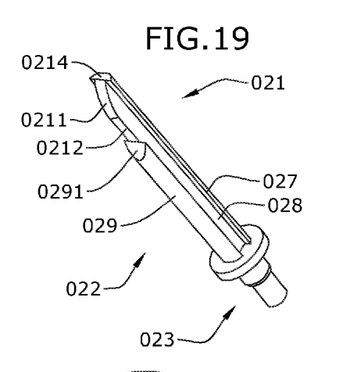
FIG. 19 depicts a perspective view of an alternative embodiment of the water treatment cartridge illustrating a specially shaped valve stem.
Figure 20:
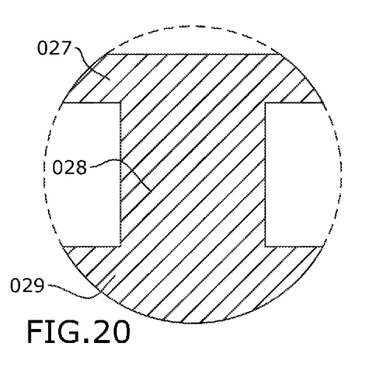
FIG. 20 depicts a section view of the alternative embodiment of the water treatment cartridge illustrating a rod portion of the specially shaped valve stem in FIG. 19.
Figure 21:
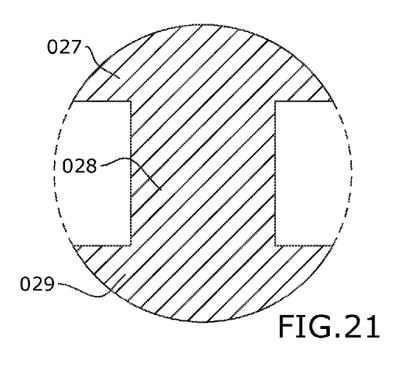
FIG. 21 depicts a section view of the alternative embodiment of the water treatment cartridge illustrating a rod portion of the specially shaped valve stem in FIG. 19.
Figure 22:
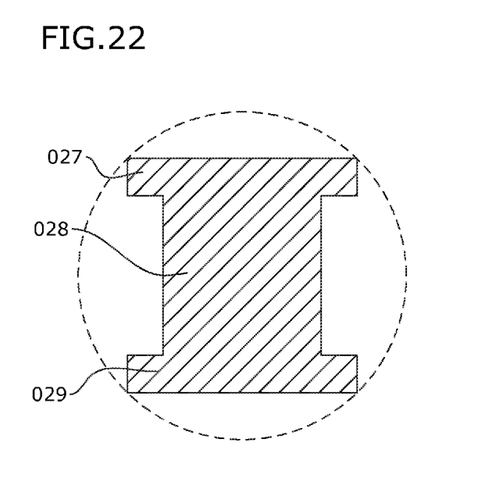
FIG. 22 depicts a section view of the alternative embodiment of the water treatment cartridge illustrating a rod portion of the specially shaped valve stem in FIG. 19.

FIG. 19 depicts an alternative embodiment of specially shaped valve stem 02 that comprises several components substantially similar to the valve stem in FIG. 3. In this embodiment, the structure of tail portion 023 remains the same. Head portion 021 and rod portion 022 are integrally formed. Specially shaped valve stem 02 comprises first supporting wall 027, intermediate supporting rib 028 and second supporting wall 029. Rod portion 022 is a uniform cross section portion that is similar to an I-shape and is provided with coaxial circumscribed circles. The cross section similar to the I-shape in rod portion 022 is intersected with the circumscribed circle thereof as a point or an arc, i.e., each surface of first supporting wall 027 and second supporting wall 029 facing outside along the extending direction can be an independent plane, cambered surface or plane with cambered surface circular bead respectively. Several structures of the cross section similar to the I-shape of rod portion 022 and the circumscribed circle thereof are shown in FIGS. 20-22.

The top portion of first supporting wall 027 is top plane 0214 oriented perpendicular to the extending direction of rod portion 022. The top portion of intermediate supporting rib 028 intersects with top plane 0214 and extends downward to form driving inclined plane 0211. A portion of intermediate supporting rib 028 higher than second supporting wall 029 forms pressing plane 0212. The top terminal of second supporting wall 029 extends towards the direction of intermediate supporting rib 028 to form supporting wall inclined plane 0291, which is beneficial in guiding and improving the stability of the supporting effect of the valve stem.

Figure 23:
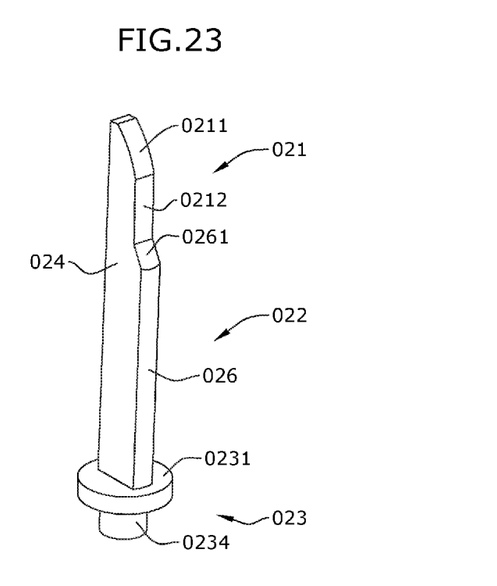
FIG. 23 depicts a perspective view of an alternative embodiment of the water treatment cartridge illustrating a specially shaped valve stem.
Figure 24:
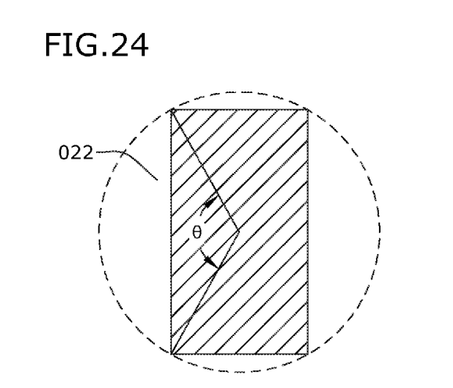
FIG. 24 depicts a sectional view of the alternative embodiment of the water treatment cartridge illustrating the rod portion of the specially shaped valve stem in FIG. 23.
Figure 25:
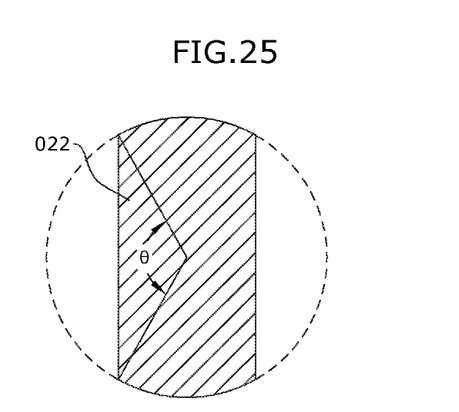
FIG. 25 depicts a sectional view of the alternative embodiment of the water treatment cartridge illustrating the rod portion of the specially shaped valve stem in FIG. 23.

FIG. 23 depicts an alternative embodiment of specially shaped valve stem 02 that comprises several components substantially similar to the valve stem in FIG. 3. In this embodiment, tail portion 023 comprises platform 0231, original supporting portion 0232 and limiting portion 0233, which are integrally synthesized as supporting and limiting portion 0234. Head portion 021 and rod portion 022 are integrally formed. Reinforcing ribs 025 symmetrically arranged at both wings of trapezoid wall 024 are eliminated. In this embodiment, the specially shaped valve stem is formed by trapezoid wall 024 located in the middle and supporting rib 026 located at the shorter end of trapezoid wall 024. Rod portion 022 is a uniform section portion, which comprises a straight-line generally rectangular shape and is provided with coaxially circumscribed circles. The straight-line shaped cross section of rod portion 022 can be intersected with the circumscribed circle thereof as a point or an arc, and examples of the non-limiting shape of the cross section of the rod portion are shown in FIG. 24 and FIG. 25.

In order to ensure the supporting strength of the specially shaped valve stem, central angle θ corresponding to the circumscribed circular arc between any two points of intersection of the cross section and the circumscribed circle thereof is not greater than 150° and preferably not greater than 120°. The horizontal extending portion of the top bevel edge of trapezoid wall 024 forms driving inclined plane 0211. The height of supporting rib 026 is lower than the height of the shorter end of trapezoid wall 024. The top terminal of supporting rib 026 extends along the direction of trapezoid wall 024 to form supporting rib inclined plane 0261. Pressing plane 0212 intersects driving inclined plane 0211 and supporting rib inclined plane 0261.

Figure 26:
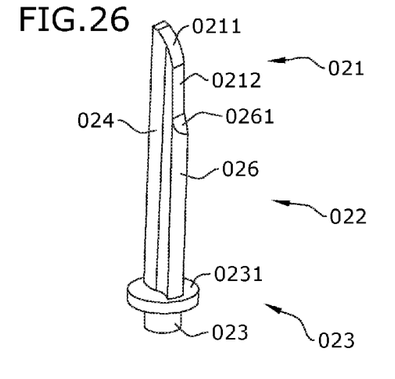
FIG. 26 depicts a perspective view of an alternative embodiment of the water treatment cartridge illustrating a specially shaped valve stem.
Figure 27:
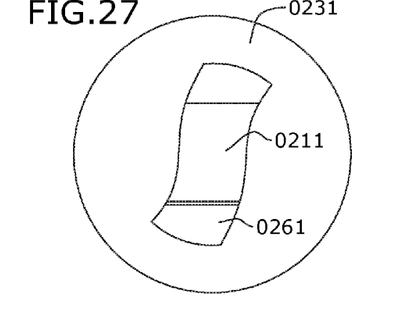
FIG. 27 depicts a top view of the alternative embodiment of the water treatment cartridge illustrating the specially shaped valve stem in FIG. 26.
Figure 28:
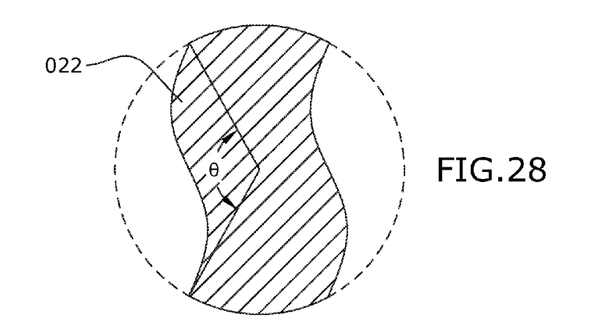
FIG. 28 depicts a sectional view of the alternative embodiment of the water treatment cartridge illustrating the rod portion of the specially shaped valve stem in FIG. 26.

FIG. 26 depicts an alternative embodiment of specially shaped valve stem 02 that is similar to the valve stem shown in FIG. 23. In this embodiment, the vertical extending plane of head portion 021 and rod portion 022 of the specially shaped valve stem is converted into a curved surface as shown in the top view in FIG. 27 and sectional view in FIG. 28. The curved surface creates a generally S-shaped rod portion 022. In order to ensure the supporting strength of the specially shaped valve stem, the maximum central angle θ corresponding to the circumscribed circular arc between any two points of intersection of the cross section of the S-shaped rod portion and the circumscribed circle thereof is not greater than 150° and preferably not greater than 120°.

Figure 29:
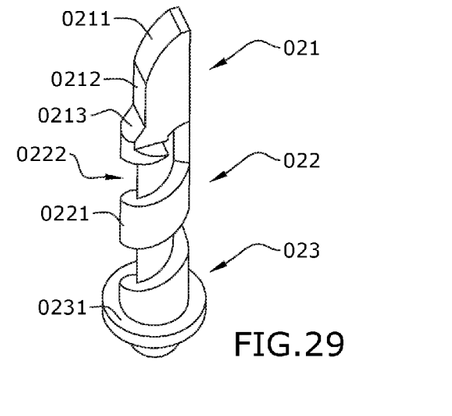
FIG. 29 depicts a perspective view of an alternative embodiment of the water treatment cartridge illustrating a specially shaped valve stem.
Figure 30:
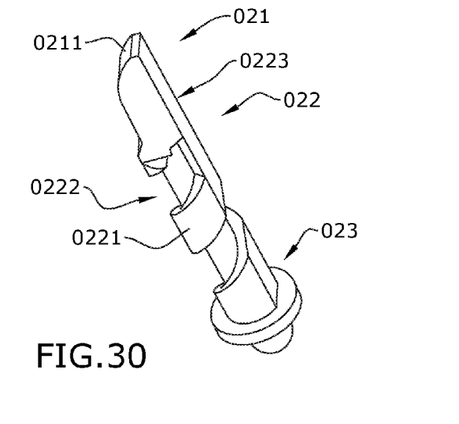
FIG. 30 depicts a perspective view of the alternative embodiment of the water treatment cartridge illustrating a specially shaped valve stem.

FIG. 29 depicts an alternative embodiment of specially shaped valve stem 02 that comprises several components substantially similar to the valve stem in FIG. 3. In this embodiment, the tail portion 023 comprises platform 0231. Rod portion 022 is formed by cutting part of cylinder 0221 to create spiral passage 0222, which is located along the axial extending direction of rod portion 022. The cut rod portion 022 forms rod plane 0223. On any cross section of cylinder 0221 perpendicular to the axial direction, the central angle corresponding to the circumscribed circular arc between any two points of intersection of rod plane 0223 and the circumscribed circle thereof is not greater than 150° and preferably not greater than 120°. Rod plane 0223 extends upwards to the top end of head portion 021 from rod portion 022. At one side of head portion 021 opposite to rod plane 0223, dividing inclined plane 0211, pressing plane 0212 and transition inclined plane 0213 are extended downward from the top end of head portion 021 in a step-like mode in order. Transition inclined plane 0213 extends and is intersected with the outer side face of rod portion 022, which continuously extends upward to head portion 021.

Figure 33:
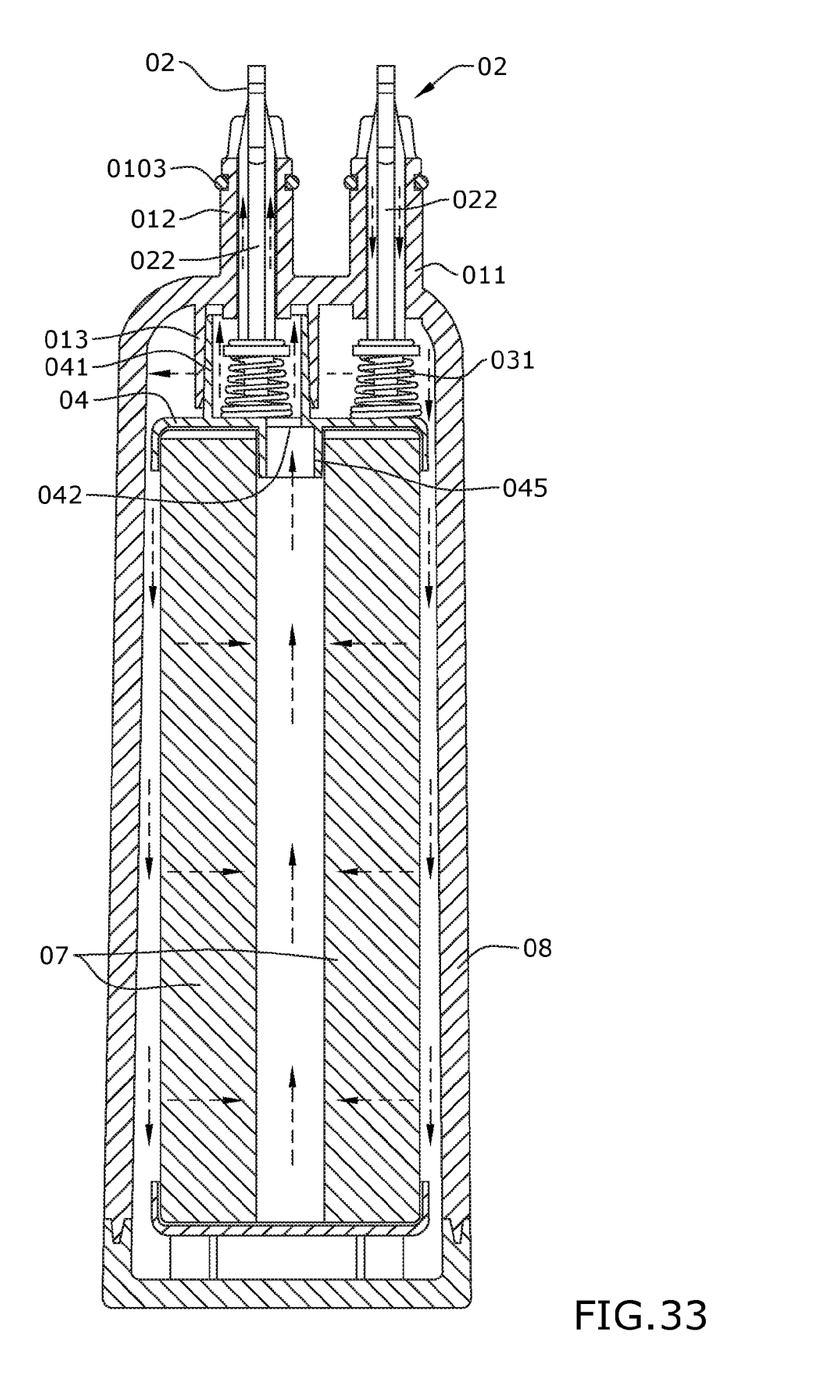
FIG. 33 depicts a sectional view of certain embodiments of the water treatment cartridge shown in use.

In certain embodiments, the outer side face of water ingoing-outgoing cylinder 010 is provided with one or more ring grooves 0102 as shown in FIGS. 2-3 and 32. Each ring groove 0102 is configured to receive first seal ring 0103 as shown in FIG. 33 for creating a plug-in seal with assembly head 06 during use. In a preferred embodiment, supporting wall 014 (FIGS. 2-3 and 32) extends from the top end of water ingoing-outgoing cylinder 010 and comprises an arc shape. The height of the vertex of supporting wall 014 is less than the position of the maximum height of the installed specially shaped valve stem 02 when moved to the minimum position in cartridge body 08. Supporting wall 014 can provide a supporting force facing outside perpendicular to pressing plane 0212 for specially shaped valve stem 02. In certain preferred embodiments, the symmetric surface of supporting wall 014 parallel to the extending direction of water ingoing-outgoing cylinder 010 is overlapped with the symmetric surface of pressing plane 0212 parallel to the extending direction of the specially shaped valve stem 02.

In certain embodiments depicted in FIG. 3, the rim of inner end cover 04 further extends downward to form end cover outer ring 044. The center of inner end cover 04 further extends downward to form end cover inner ring 045. A passage formed by end cover inner ring 045 is communicated with through hole 042. The end cover outer ring 044 and end cover inner ring 045 are used for limiting installation of a circular treatment media 07 in cartridge body 08 as shown in FIG. 3 and FIG. 33.

FIG. 31 depicts a sectional view of an opened water route for water treatment after one embodiment of the water treatment cartridge is plugged in with assembly head 06. Water ingoing-outgoing cylinder 010 and assembly head 06 are sealed by first sealing ring 0103. Specially shaped valve stem 02 presses driving valve 061 with driving inclined plane 0211 in the plugging-in process and maintains the pressed state of driving valve 061 through contact with pressing plane 0212. At this time, driving valve 061 is in the opened and compressed state, which permits water to flow through. This allows the exchange of water from assembly head 06 in and out of cartridge body 08 due to the flow of water through the gap between water inlet-outlet passage 0101 and rod portion 022 of specially shaped valve stem 02. Although FIG. 31 depicts a single driving valve 061, it shall be appreciated that a pair of driving valves 061 exist within assembly head 06, which correspond to the pair of specially shaped valve stems 02 disposed within water ingoing cylinder 011 and water outgoing cylinder 012 respectively.

At this time, the position of specially shaped valve stem 02 in the cartridge is shown in FIG. 32. In this position, specially shaped valve stem 02 compresses each driving spring 03 to move to the minimum position. Limiting portion 0233 contacts outer end face 043 of inner end cover 04 and generates an interaction force. Platform 0231 and second seal ring 05 fixed thereon of each specially shaped valve stem 02 are detached from the end port of water inlet-outlet passage 0101 in the cartridge, thereby permitting water to flow through in and out of the cartridge.

The cyclic process of the water route in the cartridge is shown in FIG. 33 and noted by the dotted arrows. The water flow passes into the cartridge through a gap between water inlet passage 0111 and rod portion 022 of specially shaped valve stem 02 to the rim of treatment media 07. The water flows through the center of treatment media 07 to complete the filtration process, then passes through end cover inner ring 045, through hole 042 and second dividing wall 041. The water then flows out of the cartridge through a gap between water outlet passage 0121 and rod portion 022 of specially shaped valve stem 02.

When the water treatment cartridge is removed from assembling head 06, rod portion 022 of each specially shaped valve stem 02 moves upward under the action of the restoring force of driving spring 03. This permits limiting portion 0233 to leave outer end face 043 of inner end cover 04 and causes platform 0231 and second seal ring 05 of each specially shaped valve stem 02 to contact and seal water inlet-outlet passage 0101. This seals the water passage, thereby preventing dripping and leaking of remaining water in the cartridge. FIG. 2 depicts the configuration of specially shaped valve stems 02 in the closed state.

It shall be appreciated that the components of the water treatment cartridge described in several embodiments herein may comprise any alternative known materials in the field and be of any color, size and/or dimensions. It shall be appreciated that the components of the water treatment cartridge described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A water treatment cartridge for use with an assembly head comprising a pair of valves for controlling the flow of water therethrough, the water treatment cartridge comprising an inlet and an outlet both in communication with the valves and configured to automatically close upon a removal of the water treatment cartridge from the assembly head, thereby minimizing water leaks and contamination to the water treatment cartridge, the water treatment cartridge comprising:

a connector member detachably coupled to the assembly head and comprising a cartridge body comprising an inlet and an outlet;

a first generally circular dividing wall coupled to an interior of the cartridge body and positioned around the outlet;

an inner end cover coupled to the interior of the cartridge body, the inner end cover comprising an outer top face, a second generally circular dividing wall coupled to both the outer top face and an interior wall of the first generally circular dividing wall, and a hole disposed on the outer top face within the second generally circular dividing wall;

a pair of valve stems disposed within the cartridge body and configured to be operably connected to the assembly head, the pair of valve stems comprising a first valve stem disposed within the inlet and a second valve stem disposed within the outlet, each valve stem of the pair of valve stems comprising a head portion extending out of the inlet or outlet, a rod portion enclosed within the inlet or outlet, and a tail portion positioned within the cartridge body; and a pair of driving springs coupled to the pair of valve stems, the pair of driving springs comprising a first driving spring in contact with the tail portion of the first valve stem and inner end cover and a second driving spring in contact with the tail portion of the second valve stem and inner end cover, the first driving spring in contact with a first portion of the outer top face of the inner end cover, the second driving spring housed within the second generally circular dividing wall and in contact with a second portion of the outer top face of the inner end cover;

wherein the head portions of both the first and second valve stems are configured to contact the assembly head to compress the first and second driving springs, thereby removing the tail portions of the first and second valve stems from the inlet and outlet to permit water to flow therethrough;

wherein the first and second valve stems are configured to be detached from the assembly head to decompress the first and second driving springs, thereby permitting the tail portions of the first and second valve stems to seal both the inlet and outlet, thereby minimizing water leaks and contamination to the water treatment cartridge.

2. The water treatment cartridge of claim 1, further comprising a pair of seal rings coupled to the pair of tail portions of the pair of valve stems.

3. The water treatment cartridge of claim 2, wherein the tail portion of each valve stem in the pair of valve stems comprises a circular platform and a limiting portion member coupled to the circular platform, wherein the head and rod portions of each valve stem in the pair of valve stems comprises a trapezoid-shaped wall coupled to the circular platform, a pair of reinforcing ribs coupled to opposing sides of the trapezoid-shaped wall, and a supporting rib coupled to the trapezoid-shaped wall.

4. The water treatment cartridge of claim 3, wherein each reinforcing rib of the pair of reinforcing ribs comprises an upper slanted pressing plane, wherein the trapezoid-shaped wall comprises a driving inclined plane.

5. The water treatment cartridge of claim 2, wherein the rod member of each valve stem in the pair of valve stems comprises a generally U-shaped member and the head portion comprises a first transition inclined plane, a second pressing plane and a third driving inclined plane.

6. The water treatment cartridge of claim 2, wherein the head and rod portions of each valve stem comprises a first supporting wall, an intermediate supporting rib coupled to the first supporting wall, and a second supporting wall coupled to the intermediate supporting rib, wherein the first supporting wall, intermediate supporting rib and second supporting wall form a generally I-shaped cross-section.

7. The water treatment cartridge of claim 2, wherein the rod portion of each valve stem comprises a cylindrical member with a spiral cutout and the head portion comprises a first transition inclined plane, a second pressing plane and a third driving inclined plane.

8. The water treatment cartridge of claim 2, wherein the inlet comprises a first internal passage comprising a first cross-sectional area, the outlet comprises a second internal passage comprising a second cross-sectional area, and the rod portion of each valve stem comprises a third cross-sectional area, wherein the third cross-sectional area is no greater than 80% of the first cross-sectional area or the second cross-sectional area.

* * * * *